(12) United States Patent
Hoh

(10) Patent No.: US 7,205,517 B2
(45) Date of Patent: Apr. 17, 2007

(54) COOKING CONTAINER AND MICROWAVE OVEN HAVING SUCH CONTAINER

(75) Inventor: Jung-Eui Hoh, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 265 days.

(21) Appl. No.: 10/171,998

(22) Filed: Jun. 17, 2002

(65) Prior Publication Data

US 2003/0183625 A1    Oct. 2, 2003

(30) Foreign Application Priority Data

Mar. 26, 2002 (KR) ............... 2002-16388

(51) Int. Cl.
*H05B 6/80* (2006.01)
*B65B 25/22* (2006.01)

(52) U.S. Cl. .............. 219/730; 219/732; 219/734; 219/762; 99/DIG. 14; 426/107; 426/118; 426/234; 426/241

(58) Field of Classification Search ........... 219/725, 219/729, 730, 732, 733, 734, 735, 762; 426/107, 426/109, 118, 113, 234, 241, 243; 99/DIG. 14, 99/451
See application file for complete search history.

(56) References Cited

U.S. PATENT DOCUMENTS

| | | | |
|---|---|---|---|
| 3,941,967 A | | 3/1976 | Sumi et al. ............... 219/10.55 |
| 3,994,212 A | | 11/1976 | Wong ......................... 99/444 |
| 4,362,917 A | * | 12/1982 | Freedman et al. ......... 219/730 |
| 4,398,077 A | * | 8/1983 | Freedman et al. ......... 219/729 |
| 4,413,167 A | | 11/1983 | Martel et al. ............ 219/10.55 |
| 4,454,403 A | * | 6/1984 | Teich et al. ................ 219/729 |
| 4,847,459 A | | 7/1989 | Desai ....................... 219/10.55 |
| 4,862,791 A | | 9/1989 | Baughey ...................... 99/400 |
| 4,871,892 A | | 10/1989 | Samford ................... 219/10.55 |
| 4,935,252 A | * | 6/1990 | Huang et al. ............... 426/107 |
| 5,039,833 A | * | 8/1991 | Woods ....................... 219/759 |
| 5,223,685 A | * | 6/1993 | DeRienzo, Jr. ............ 219/732 |
| 5,416,305 A | * | 5/1995 | Tambellini ................ 219/730 |
| 5,736,718 A | * | 4/1998 | Levinson ................... 219/729 |

FOREIGN PATENT DOCUMENTS

| | | | |
|---|---|---|---|
| JP | 6-113947 | | 4/1994 |
| JP | 9-135657 | * | 5/1997 |
| WO | WO 02/39861 | | 5/2002 |

* cited by examiner

*Primary Examiner*—Philip H. Leung
(74) *Attorney, Agent, or Firm*—Staas & Halsey LLP

(57) ABSTRACT

A cooking container designed to brown and scorch slightly both sides of food at the same time, and a microwave oven having such a cooking container. This cooking container includes a pan body and a lid, each including a heating part generating heat using microwaves and a heat transfer part transferring heat from the heating part to food. The body of the container has a first cooking part covered with the lid, and a second cooking part having an open top. A plurality of embossments are provided on each of the first cooking part and the lid while being regularly spaced apart from each other, and so both sides of sliced bread laid in the first cooking part are thus browned and scorched slightly during the process of cooking. The second cooking part is used for frying eggs. A coated layer is formed on the inside surface of each heat transfer part of the container, thus preventing a corrosion of the heat transfer part and a sticking of food to the heat transfer part. The pan body and the lid are seated in the cooking cavity while being contained in upper and lower casings made of a material capable of transmitting microwaves.

36 Claims, 6 Drawing Sheets

COOKING CONTAINER AND MICROWAVE OVEN HAVING SUCH CONTAINER

CROSS-REFERENCE TO RELATED APPLICATIONS

This application claims the benefit of Korean Application No. 02-16388, filed Mar. 26, 2002, in the Korean Industrial Property Office, the disclosure of which is incorporated herein by reference.

BACKGROUND OF THE INVENTION

1. Field of the Invention

The present invention relates, in general, to cooking containers used with microwave ovens and, more particularly, to cooking containers designed to brown or scorch slightly both sides of several sliced pieces of bread at the same time using microwaves of a microwave oven while toasting the bread, and to fry an egg at the same time as toasting the sliced bread, thus allowing a user to easily and quickly prepare toasted bread with fried eggs. The present invention also relates to a microwave oven provided with such a cooking container.

2. Description of the Prior Art

As well known to those skilled in the art, a microwave oven is an electrically operated oven, which heats and/or cooks food placed in its cooking cavity using high-frequency electromagnetic waves generated by the oscillation of a magnetron installed in a machine room. That is, during an operation of such a microwave oven, the magnetron inside the machine room of the oven radiates high-frequency electromagnetic waves, so-called "microwaves," through the cooking cavity. The microwaves thus penetrate food so as to repeatedly change the molecular arrangement of moisture laden in the food, thus causing the molecules of moisture to vibrate and generating frictional heat within the food to cook it. A cooking tray is set on the bottom of the cooking cavity, and is loaded with food thereon. The cooking tray loaded with food is turned at a low speed, thus allowing the microwaves to uniformly penetrate the entire area of the food.

A variety of cooking containers have been used to contain food therein when it is desired to cook or heat the food in the cooking cavity of such a microwave oven during the process of cooking. Such cooking containers have been typically made of materials capable of allowing a transmission of microwaves through them to cook or heat the food. In recent years, specifically designed cooking containers for microwave ovens, which emit heat when exposed to microwaves, thus browning or scorching slightly both sides of food, such as sliced bread, pizza, or fish contained therein, have been proposed and used.

FIG. 1 shows a conventional cooking container used with microwave ovens, which is designed to brown or scorch slightly both sides of food, such as sliced bread or pizza.

As illustrated in the drawing, the conventional cooking container used with microwave ovens comprises a pan body 1, on which food, such as sliced bread or pizza, is placed. The open top of the body 1 is provided with a lid 5 to cover food. The body 1 consists of a heating part 2 and a heat transfer part 3. The heating part 2 is made of a mixture of rubber and ferrite, and emits heat when it is exposed to microwaves. The heat transfer part 3 is formed on the upper surface of the heating part 2, and transfers heat from the heating part 2 to the lower side of the food. In the same manner as that described for the pan body 1, the lid 5 consists of a heating part 6 and a heat transfer part 7. The heating part 6 of the lid 5 is made of a mixture of rubber and ferrite, and emits heat when it is exposed to microwaves. The heat transfer part 7 of the lid 5 is formed on the lower surface of the heating part 6, and transfers heat from the heating part 6 to the upper side of the food.

In order to space the lid 5 from the body 1 by a predetermined gap, thereby preventing an undesired generation of microwave-induced sparks between the body 1 and the lid 5, a plurality of spacers 4 extend upward from the heating part 2 of the body 1 such that the spacers 4 pass through the heat transfer part 3 until they project by a certain height from the upper surface of said heat transfer part 3.

In order to brown or scorch slightly both sides of food, such as sliced bread or pizza, using such a cooking container, the food is placed in the body 1 and covered with the lid 5, and the container is seated in the cooking cavity of the microwave oven. When turning the microwave oven on after seating the container in the cooking cavity, a magnetron radiates microwaves through the cooking cavity. The two heating parts 2 and 6 of the body 1 and lid 5, respectively, absorb the microwaves, and emit heat to the associated heat transfer parts 3 and 7 such that the heat transfer parts 3 and 7 are intensely heated to increase their temperatures, thus browning and scorching both sides of the food.

However, such a conventional cooking container used with microwave ovens is problematic in that the two heat transfer parts of such cooking containers are typically made of aluminum. In addition, the cooking containers are designed such that the heat transfer parts made of aluminum come into direct contact with food during the process of cooking. Therefore, acid or alkaline substances of food may easily corrode aluminum of the heat transfer parts, thus forming corroded areas at the heat transfer parts. Dregs of food may be caught and spoiled at the corroded areas, and so the conventional cooking containers may produce a variety of harmful substances, which are bad for human health.

In addition, during the process of cooking, food may be easily stuck to and excessively scorched at the highly heated aluminum surfaces of the heat transfer parts. In such a case, the food gives off odor to contaminate the atmosphere around the microwave oven, thus upsetting persons around the oven. In addition, it is very difficult to wash the cooking container when food is stuck to and excessively scorched at the aluminum surfaces of the heat transfer parts.

Due to the spacers provided at the pan body to prevent generation of microwave-induced sparks between the body and the lid, the lid may not come into contact with the upper side of food. In such a case, a sufficient quantity of heat is not transferred to the upper side of the food, and so the upper and lower sides of the food may not be uniformly cooked.

Sliced bread or pizza typically contains a substantial quantity of moisture, and generates steam during the process of cooking. However, the conventional cooking container used with microwave ovens does not have any means to effectively or quickly exhaust such steam, and so a steam layer may be formed between the lower side of food and the body of the container, thus preventing the food from being browned or scorched to a desired amount.

Another problem of the conventional cooking container used with microwave ovens is that the conventional container has a structure merely suitable to cook the same kind of food at one time, thus forcing a user, wanting to eat toasted bread with fried eggs, to separately fry the eggs and then toast the sliced bread or visa versa.

SUMMARY OF THE INVENTION

Accordingly, it is an object of the present invention to provide a cooking container and a microwave oven having such a container, which is designed to brown and scorch slightly both sides of food at the same time.

Another object of the present invention is to provide a cooking container and a microwave oven having such a container, which cooks sliced bread and at least one egg at the same time, thus allowing a user to easily and quickly prepare toasted bread with at least one fried egg.

It is another object of the present invention to provide a cooking container and a microwave oven having such a container, which is processed on its food contact surfaces such that the food contact surfaces do not undergo any chemical reaction with food and do not allow the food to be stuck to the food contact surfaces.

Additional objects and advantages of the invention will be set forth in part in the description which follows and, in part, will be obvious from the description, or may be learned by practice of the invention.

The foregoing and other objects of the present invention are achieved by providing a cooking container comprising: a body and a lid, each of the body and the lid including a heating part generating heat by using microwaves, and a heat transfer part transferring heat from the heating part to food, wherein at least one of the body and the lid is provided on an inside surface thereof with an embossment to be brought into contact with the food at the embossment.

In the cooking container, the embossment may be provided on each of the body and the lid, thus forming a first cooking part. In another aspect of the invention, two or more embossments are provided on each of the body and the lid while being regularly spaced apart from each other.

The cooking container further comprises a second cooking part extending from the first cooking part such that the embossment of the first cooking part receives bread and the second cooking part receives eggs. The sliced bread and the eggs are thus cooked at the same time.

The foregoing and other objects of the present invention may also be achieved by providing a microwave oven having a cooking cavity through which microwaves are radiated, and a cooking container seated in the cooking cavity and used to cook food using the microwaves, wherein the cooking container comprises: a body and a lid, each of the body and the lid including a heating part generating heat using the microwaves, and a heat transfer part transferring heat from the heating part to the food; and an embossment provided on an inside surface of at least one of the body and the lid to be brought into contact with the food.

The body and the lid are seated in the cooking cavity of the microwave oven while being contained in upper and lower casings made of a material capable of transmitting the microwaves.

The upper and lower casings are preferably made of a material capable of resisting heat emitted from the body and the lid, at at least portions thereof coming into contact with or proximate to the body and the lid.

In addition, the lower casing is provided on the bottom thereof with a drain hole to drain moisture generated from the food during a process of cooking.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
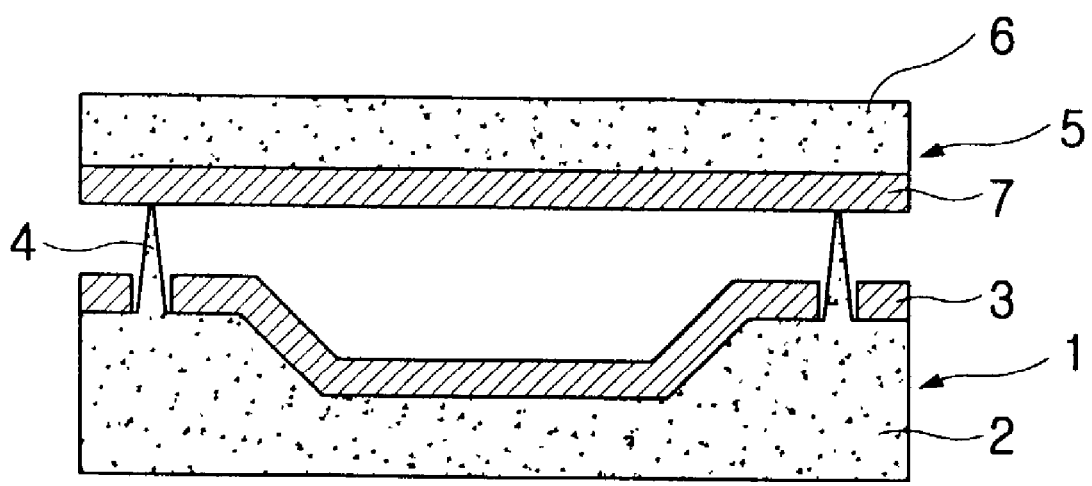
FIG. 1 is a sectional view of a conventional cooking container used with microwave ovens.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
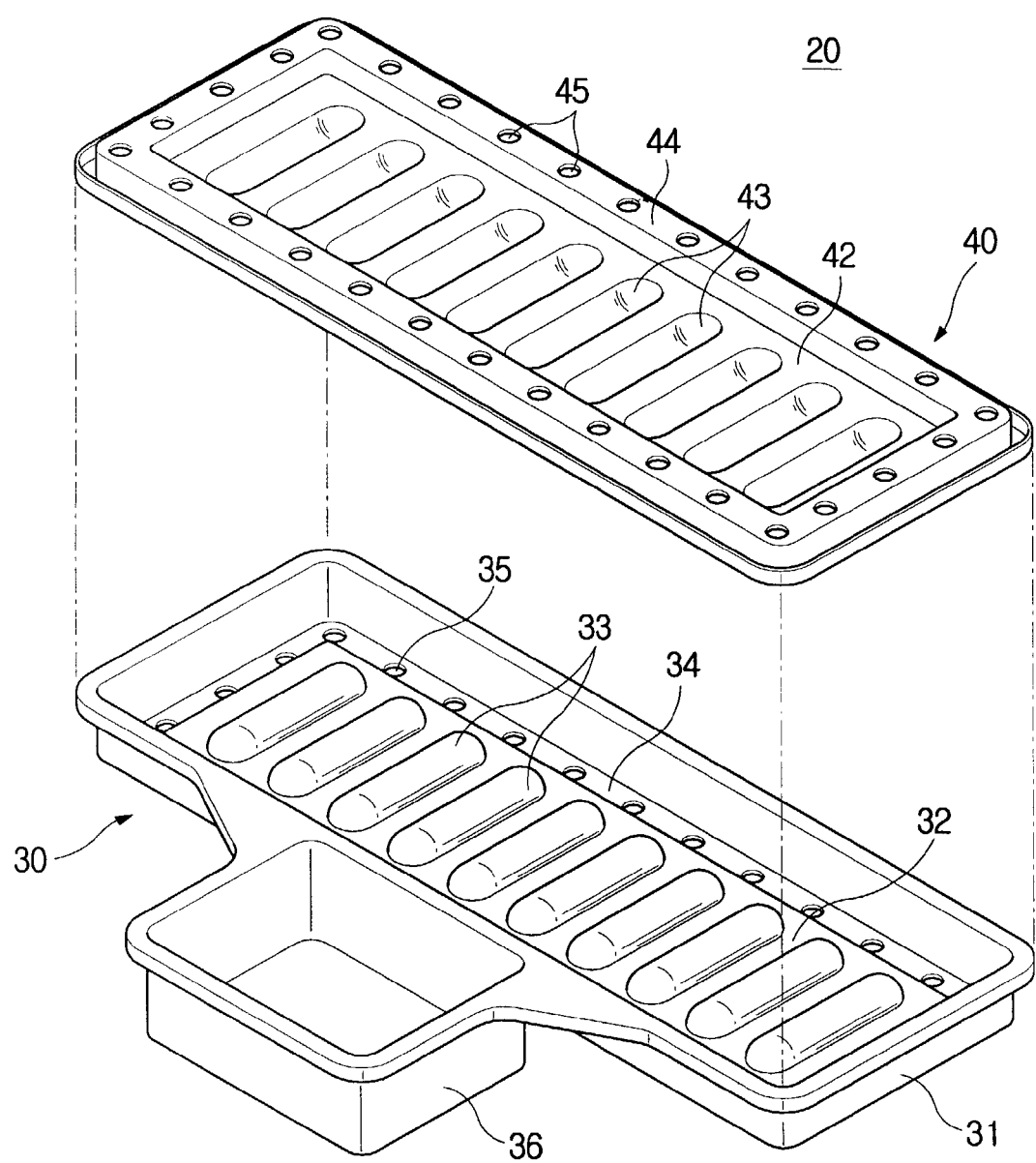
FIG. 2 is a perspective view, illustrating the construction of a body and lid of a cooking container used with microwave ovens in accordance with an embodiment of the present invention when the lid is separated from the body.

FIG. 2 is a view, illustrating the construction of the pan body 30 and lid 40 of a cooking container 20 used with microwave ovens in accordance with an embodiment of the present invention. As illustrated in the figure, the pan body 30 includes two cooking parts, that is, a first cooking part 31 and a second cooking part 36. The first cooking part 31 has a longitudinal rectangular profile, while the second cooking part 36 has a generally square profile and is formed at an edge of the first cooking part 31.

The first cooking part 31 has an uplifted portion 32, which is formed at the central area of the bottom of said part 31 by uplifting said central area. Regularly formed on the uplifted portion 32 are a plurality of upward embossments 33. The outside edges of the uplifted portion 32 are constantly spaced apart from the sidewalls of the first cooking part 31, thus extending in parallel to the sidewalls of the first cooking part 31 while defining a first rectangular channel 34 along the gap between the outside edges of the uplifted portion 32 and the sidewalls of the first cooking part 31. A plurality of first exhaust holes 35 are regularly formed along the bottom of the rectangular channel 34. The upward embossments 33 each have a longitudinal shape, and are transversely arranged on the uplifted portion 32. That is, the embossments 33 are arranged while intersecting the longitudinal axis of the first cooking part 31 at right angles. Due to such embossments 33, the uplifted portion 32 has a rugged upper surface.

The open top of the first cooking part 31 of the body 30 is covered with the lid 40 that will be described in detail later herein. With the lid 40 covering the body 30, both sides of food, such as sliced pieces of bread or sectored pieces of pizza received in the container 20, can be appropriately browned or scorched. In the present invention, it is an aspect to somewhat freely size the first cooking part 31 such that said first cooking part 31 neatly contains a predetermined number of sliced pieces of bread therein without leaving an excessive surplus space. That is, the first cooking part 31 can be sized such that its width is slightly larger than the length of a sliced piece of bread, and its length is slightly larger than the total width of the predetermined number of sliced pieces of bread to be toasted at the same time using the container 20. Therefore, the predetermined number of sliced pieces of bread are neatly arranged in the first cooking part during one process of toasting.

The second cooking part 36 is integrally and exteriorly formed at one of two longer sidewalls of the first cooking part 31. This second cooking part 36 has a predetermined depth suitable to contain an egg while frying the egg.

The lid 40, covering the first cooking part 31, has a construction similar to that of the first cooking part 31. That is, the lid 40 has a bulged portion 42, which is formed at the central area of the top wall of the lid 40 by bulging said central area downwardly. Regularly formed on the bulged portion 42 are a plurality of downward embossments 43. In the same manner as that described for the first cooking part 31 of the pan body 30, a second edge channel 44 having a rectangular shape is formed along the gap between the outside edge of the bulged portion 42 and the sidewall of the lid 40. A plurality of second exhaust holes 45 are regularly formed along the edge channel 44. The second exhaust holes 45 exhaust steam generated from food during the process of cooking.

In an effort to prevent an undesired introduction of microwaves to food inside the first cooking part 31 through the first and second exhaust holes 35 and 45 of the first cooking part 31 and the lid 40, each of the exhaust holes 35 and 45 is preferably sized to have a diameter not larger than 15 mm, which is equal to ⅛ of the wavelength of the microwaves having an oscillation frequency of 2450 MHz.

Figure 3:
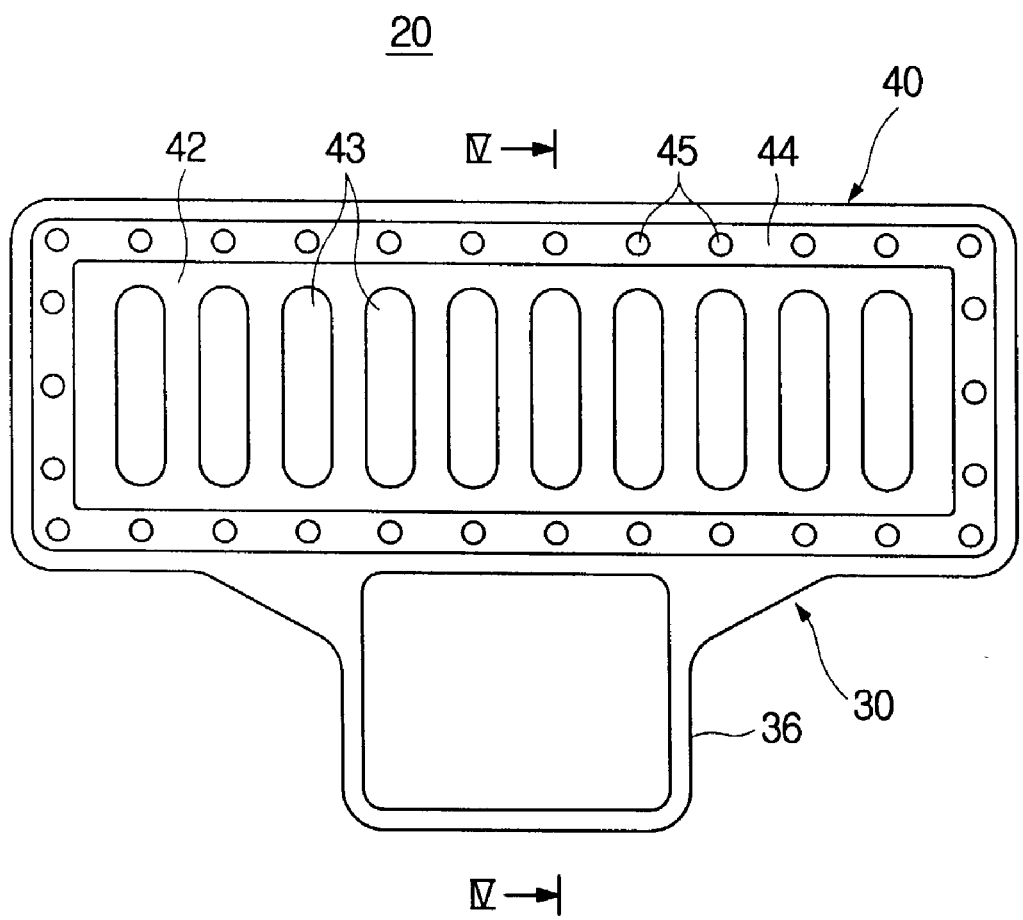
FIG. 3 is a plan view of the cooking container of FIG. 2, with the lid placed at its position on the body.

FIG. 3 is a plan view of the cooking container 20, with the lid 40 covering the first cooking part 31 of the body 30. As illustrated in the figure, the lid 40 has a construction similar to that of the first cooking part 31, and covers the upper side of food therein, such as sliced pieces of bread or sectored pieces of pizza neatly seated in the first cooking part 31. The open top of the second cooking part 36 used to fry eggs is not covered, but is kept open during the process of frying.

During the process of cooking using such a container 20 of FIGS. 2 and 3, food comes into contact with the upward and downward embossments 33 and 43 at its lower and upper sides, respectively, and is cooked by heat emitted by both the body 30 and the lid 40. Most steam, generated from the food during the cooking process, primarily passes outward through the gaps formed between the embossments 33 and 43, and is secondarily exhausted from the container 20 to the outside through a gap which is formed between the outside edges of the first cooking part 31 and the lid 40 due to the thickness of the food. Remaining steam is effectively exhausted from the container 20 to the outside through the exhaust holes 35 and 45, and so it is possible to appropriately brown and scorch slightly both sides of the food.

An egg, placed on the bottom of the second cooking part 36 during the process of cooking, is fried at its lower side by heat of the bottom of the cooking part 36. In such a case, the upper side of the egg is exposed to the microwaves, thus being cooked by microwave-induced frictional heat.

Figure 4:
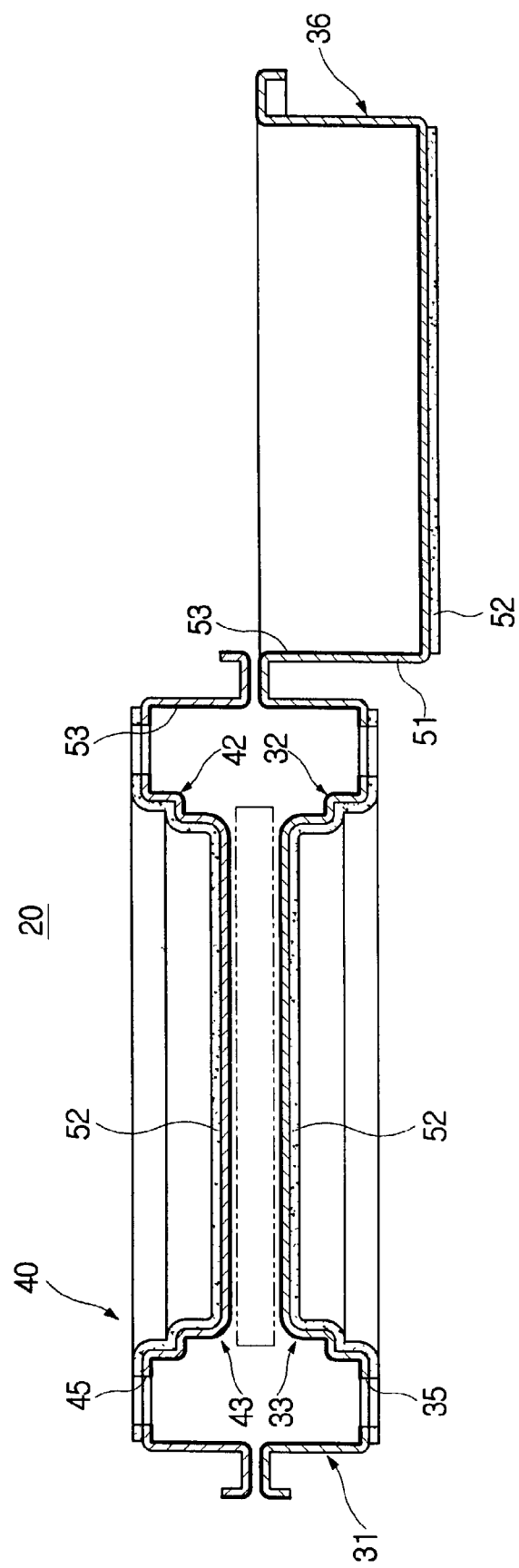
FIG. 4 is a sectional view of the cooking container of FIG. 3 taken along the line IV—IV of FIG. 3.

FIG. 4 is a sectional view of the cooking container 20 taken along the line IV—IV of FIG. 3. As illustrated in the figure, the base frame of each of the pan body 30 and the lid 40 is formed by a heat transfer part 51. That is, the appearance of each of the pan body 30 and the lid 40 is defined by the heat transfer part 51. A heating part 52 is formed on the heat transfer part 51 of each of the body 30 and the lid 40. In a detailed description, the heating part 52 of the pan body 30 is formed on the lower surface of the pan body's heat transfer part 51 at positions corresponding to the bottom walls of the first and second cooking parts 31 and 36. The heating part 52 of the lid 40 is formed on the upper surface of the lid's heat transfer part 51 at a position corresponding to the top wall of the lid 40. A coated layer 53 is formed on the exposed surface of each heat transfer part 51.

In the cooking container 20, the heating part 52 of each of the body 30 and the lid 40 is made of a mixture of silicon rubber and ferrite powder, and generates heat when it is exposed to microwaves. The heating value of such a heating part 52 increases in proportion to the weight ratio of the ferrite powder to the silicon rubber or the thickness of the heating part 52.

The sectional area of the body 30 is larger than that of the lid 40. In the body 30, the heating part 52 is only formed at portions corresponding to the bottoms of the first and second cooking parts 31 and 36. Therefore, the body 30 may fail to transfer a sufficient quantity of heat to food while cooking the food. It is thus necessary to design the body 30 such that the body 30 generates a sufficient heating value higher than that of the lid 40.

In order to accomplish the above object, the mixture of silicon rubber and ferrite powder used to form the heating part 52 of the body 30 is prepared such that the weight ratio of the ferrite powder to the silicon rubber is higher than that of the heating part 52 of the lid 40. The heating part 52 of the body 30 is thus allowed to generate a higher quantity of heating value than that of the heating part 52 of the lid 40. In such a case, it is possible to cook the upper and lower sides of food placed between the first cooking part 31 and the lid 40 at the same rate.

Such a desired difference between the heating values of the heating parts 52 of the body 30 and the lid 40 may be accomplished by designing the heating parts 52 such that the heating part 52 of the body 30 is slightly thicker than the heating part 52 of the lid 40.

The heat transfer parts 51 of both the body 30 and the lid 40 transfer heat from the heating parts 52 to food, thus cooking the food. Such a heat transfer part 51 is preferably made of a material having a high thermal conductivity, such as aluminum.

However, when the heat transfer parts 51 of the container 20 are made of aluminum as described above, the heat transfer parts 51 may be corroded by a chemical reaction with acid or alkaline substances included in food coming into contact with the parts 51. Therefore, in an effort to prevent such corrosion of the aluminum part 51 caused by a chemical reaction with acid or alkaline substances included in food, the heat transfer part 51 of each of the body 30 and the lid 40 is provided on the inside surface thereof with a coated layer 53 made of an appropriate material, such as a fluorine resin. The coated layer 53 also prevents food from becoming stuck to the heat transfer part 51 that may be intensively heated during the process of cooking. Therefore, it is easy for a user to wash the cooking container 20 after using it.

During the process of cooking with a microwave oven, both the body 30 and the lid 40 of the cooking container 20 are intensely heated by the heating parts 52, which absorb microwaves and generate heat. Therefore, it is almost impossible for a user to take the hot container 20 from the oven with his/her bare hands after cooking food. It is thus necessary to house both the body 30 and the lid 40 of the container 20 in an additional casing, which does not generate heat even when it is exposed to microwaves within a microwave oven.

Figure 5:
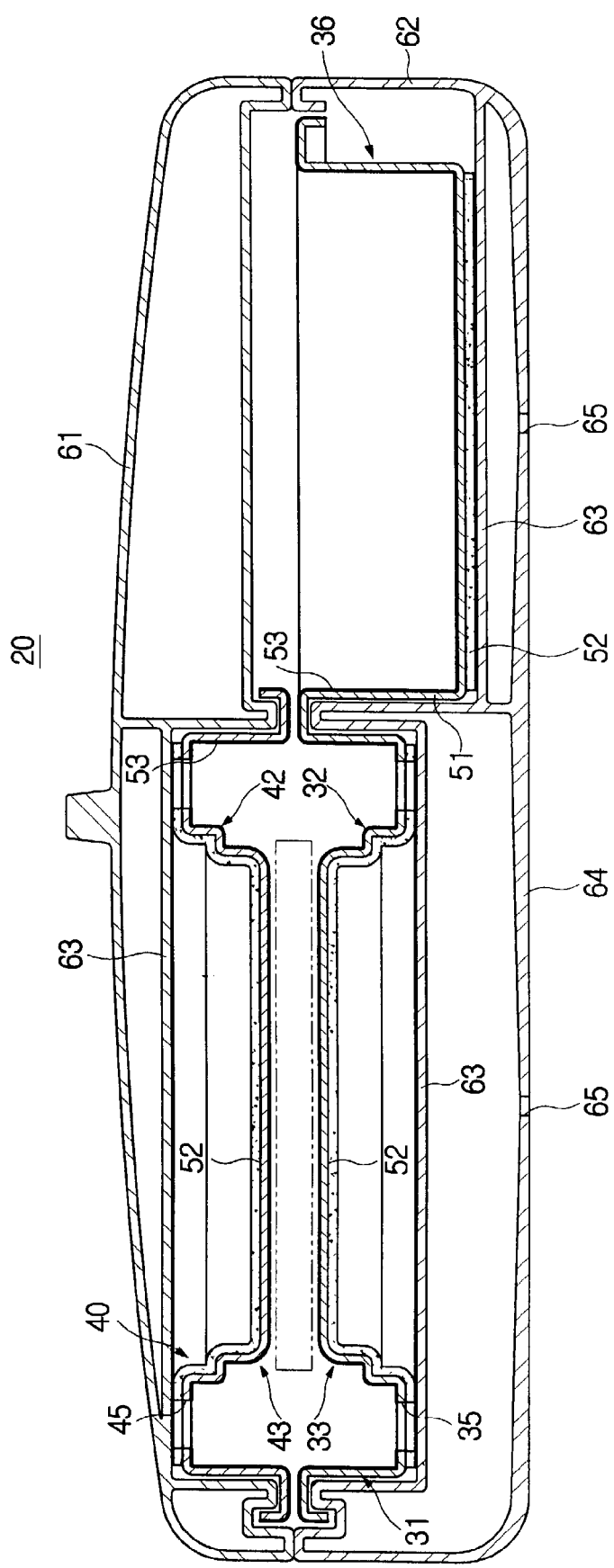
FIG. 5 is a sectional view illustrating the body and lid of the cooking container of FIG. 4 when they are housed in upper and lower casings.

FIG. 5 is a sectional view, illustrating the body 30 and the lid 40 of the cooking container 20 housed in upper and lower casings 61 and 62. As illustrated in the figure, the cooking container 20 is seated in the cooking cavity of a microwave oven during the process of cooking while being housed in the two casings 61 and 62 such that the first and second cooking parts 31 and 36 of the body 30 are received in the lower casing 62, and the open top of the second cooking part 36 and the lid 40 closing the first cooking part 31 are covered with the upper casing 61.

The upper and lower casings 61 and 62 must be made of an appropriate material, which does not generate heat when exposed to microwaves, but transmits the microwaves. Particularly, the upper and lower casings 61 and 62 are preferably made of a heat resisting material at at least portions 63 thereof coming into contact with or proximate to the body 30 and the lid 40 in an effort to prevent thermal damage to the portions 63.

In addition, the lower casing 62 is provided on its bottom 64 with a plurality of drain holes 65 to drain moisture formed by condensation of steam generated from food during the process of cooking. In an effort to allow the moisture to be easily drained to the outside through the drain holes 65, the inside surface of the bottom 64 of the lower casing 62 is inclined to guide the moisture to the holes 65.

Figure 6:
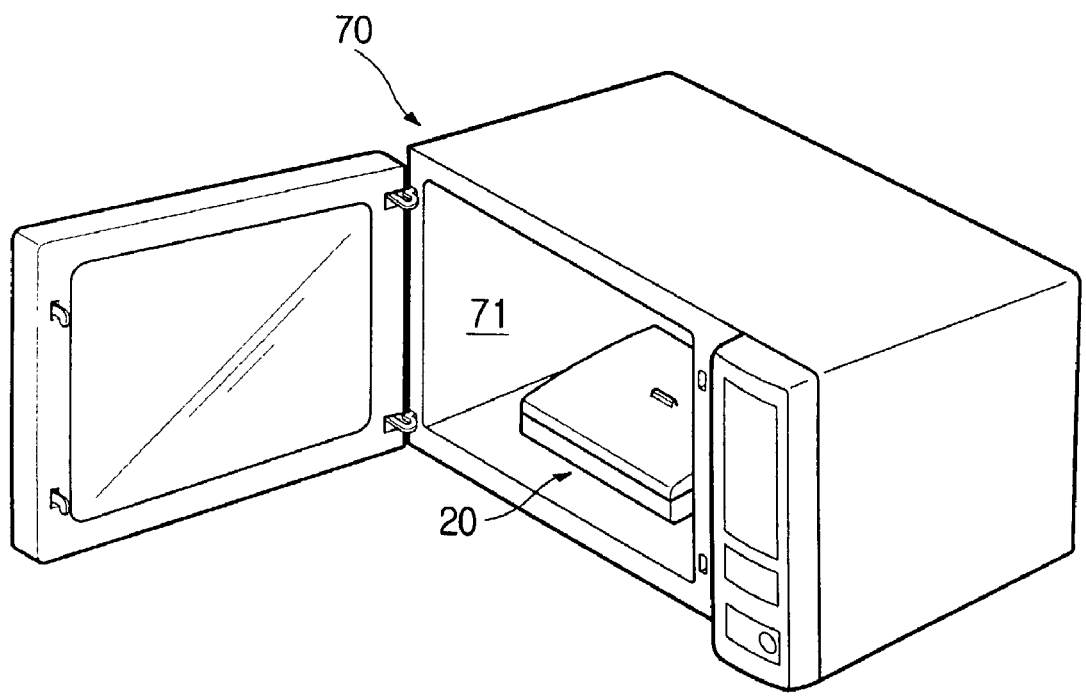
FIG. 6 is a perspective view illustrating the cooking container of FIG. 2 seated in the cooking cavity of a microwave oven.

FIG. 6 is a perspective view illustrating the cooking container 20 of this invention seated in the cooking cavity 71 of a microwave oven 70 while being housed in the upper and lower casings 61 and 62. The process of cooking using the cooking container 20 is described as follows with reference to FIGS. 5 and 6.

In order to prepare toasted bread with fried eggs using the container 20, several sliced pieces of bread are neatly arranged on the first cooking part 31 of the body 30 and are covered with the lid 40 as illustrated in FIG. 5, and an egg(s) is laid in the second cooking part 36 of the body 30. The body 30 and the lid 40 of the container 20 are thereafter housed in the upper and lower casings 61 and 62. The container 20 housed in the casings 61 and 62 is seated in the cooking cavity 71 of the microwave oven 70 as illustrated in FIG. 6 prior to turning on the oven 70. When the oven 70 is turned on as described above, the magnetron radiates microwaves through the cooking cavity 71.

In the cooking cavity 71, the microwaves transmit through the casings 61 and 62 and are absorbed by the heating parts 52 of the body 30 and the lid 40, thus causing the heating parts 52 to generate heat. The heat from the heating parts 52 of the body 30 and the lid 40 is transferred to both sides of the sliced pieces of bread, arranged on the first cooking part 31, through the heat transfer parts 51. In addition, the heat from the heating part 52 of the body 30 is also transferred to the lower side of the eggs laid in the second cooking part 36. In such a case, the upper side of the eggs is directly exposed to the microwaves through the open top of the second cooking part 36, thus being cooked by microwave-induced frictional heat.

Both sides of sliced bread coming into contact with the upward embossments 33 of the first cooking part 31 and the downward embossments 43 of the lid 40 are thus appropriately browned and scorched. During such a cooking process, steam generated from the bread primarily passes outward through the gaps formed between the embossments 33 and 43 to reach the space defined by the edge channels 34 and 44, and is secondarily exhausted from the container 20 to the outside of the body 30 and the lid 40 through a gap, which is formed between the outside edges of the first cooking part 31 and the lid 40 due to the thickness of the bread. In such a case, a part of the steam is exhausted from the container 20 to the outside through the exhaust holes 35 and 45 formed at the channels 34 and 44. The steam is, thereafter, discharged from the upper and lower casings 61 and 62 to the cooking cavity 71 of the oven 70 through the gap formed between the edges of the two casings 61 and 62. In such a case, some steam condenses on the interior surfaces of the two casings 61 and 62 to become moisture, and is drained to the cooking cavity 71 through the drain holes 65. Sliced pieces of bread or the sectored pieces of pizza, that may be arranged in the first cooking part 31 of the body 30, for example, are thus appropriately browned and scorched at both sides thereof.

In the above-mentioned embodiment of this invention, a plurality of exhaust holes 35 and 45 are formed along the edge channels 34 and 44 of both the first cooking part 31 and the lid 40 of the container 20 in an effort to exhaust steam to the outside. However, the steam generated from food during the process of cooking is effectively exhausted to the outside through a gap formed between the outside edges of the first cooking part 31 and the lid 40 due to the thickness of the food, and so the first cooking part 31 and the lid 40 may be designed such that they do not have such exhaust holes 35 and 45 even though the holes 35 and 45 allow the container 20 to more quickly exhaust the steam to the outside.

In addition, the upper side of the egg(s) seated in the second cooking part 36 is covered with the upper casing 61 such that microwaves reach the upper side of said egg(s), and so it is possible to prevent undesired evaporation of moisture from the upper side of the egg during the cooking process. The egg(s) is thus appropriately cooked while remaining moist.

As described above, the present invention provides a cooking container used with microwave ovens, and a microwave oven having such a cooking container. The cooking container is designed such that it allows food, such as sliced bread, to be cooked while being brought into direct contact at both sides thereof with the container. This cooking container also has a structure capable of quickly and effectively exhausting steam generated from food during the process of cooking to the outside of the container, thus appropriately browning and scorching both sides of the food at the same time.

The cooking container of this invention appropriately browns and scorches both sides of several sliced pieces of bread at the same time, and fries an egg at the same time as toasting the sliced bread, thus allowing a user to easily and quickly prepare toasted bread with fried egg.

In the cooking container of this invention, the pan body and the lid are provided with coated layers on their inside surfaces, at which the container comes into direct contact with both sides of food to be cooked. The coated layers do not undergo any chemical reaction with acid or alkaline substances included in food and do not allow the food to be stuck to the inside surfaces of the body and the lid of the container. Therefore, the inside surfaces of the body and the lid are not corroded by such a chemical reaction with food, but are kept clean.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking container, comprising:
   a body; and
   a lid, each of said body and said lid including a heating part generating heat by using microwaves, and a heat transfer part transferring heat from the heating part to food, wherein
   at least one of said body and said lid is provided on an inside surface thereof with an embossment extending from an uplifted portion of said body or a bulged portion on the lid to be brought into contact with the food at said embossment, and
   at least one of said body and said lid includes a hole through a non-uplifted portion of the body and a non-bulged portion of the lid.

2. The cooking container according to claim 1, wherein both of the and the lid are provided with the embossment, thus forming a first cooking part.

3. The cooking container according to claim 2, wherein two or more embossments are provided on each of the body and the lid while being regularly spaced apart from each other.

4. The cooking container according to claim 3, wherein the uplifted portion is formed at a central area of the first cooking part and containing the embossments thereon.

5. The cooking container according to claim 4, wherein outside edges of the uplifted portion are spaced apart from sidewalls of the first cooking part.

6. The cooking container according to claim 5, further comprising a first rectangular channel along gaps between the outside edges of the uplifted portion and the sidewalls of the first cooking part.

7. The cooking container according to claim 6, further comprising first exhaust holes regularly formed along the first rectangular channel.

8. The cooking container according to claim 4, wherein the embossments on the body project upward and have a longitudinal shape.

9. The cooking container according to claim 8, wherein the bulged portion is formed at a central area of the lower portion of the lid and contains the embossments thereon.

10. The cooking container according to claim 9, wherein outside edges of the bulged portion are spaced apart from sidewalls of the lid.

11. The cooking container according to claim 10, further comprising a second rectangular channel along gaps between the outside edges of the bulged portion and the sidewalls of the lid.

12. The cooking container according to claim 11, further comprising second exhaust holes regularly formed along the second rectangular channel.

13. The cooking container according to claim 12, wherein the embossments on the body project downward and have a longitudinal shape parallel with the embossments projecting upward from the first cooking part.

14. The cooking container according to claim 2, further comprising a second cooking part extending from said first cooking part, whereby the embossment of said first cooking part receives bread and said second cooking part receives at least one egg such that the sliced bread and the at least one egg are cooked at a same time.

15. The cooking container according to claim 14, wherein the heating part is formed at the bottoms of the first and second cooking parts.

16. The cooking container according to claim 15, wherein the heating parts are formed of aluminum and are coated with fluorine resin to prevent corrosion of the aluminum and to prevent the food from sticking to the heating parts.

17. The cooking container according to claim 14, further comprising a casing that does not generate heat and transmits microwaves therethrough to house the body and the lid therein.

18. The cooking container according to claim 17, wherein the casing comprises an upper casing and a lower casing to cover the first cooking part and the second cooking part.

19. The cooking container according to claim 18, wherein the lower casing comprises a plurality of drain holes at the bottom thereof to drain moisture formed by condensation during cooking.

20. The cooking container according to claim 19, wherein the inside surface of the lower casing is inclined to guide moisture to the drain holes.

21. The cooking container according to claim 14, wherein the first cooking part has a longitudinal rectangular profile, and the second cooking part has a square profile.

22. The cooking container according to claim 21, wherein the second cooking part is formed at an edge of the first cooking part.

23. The cooking container according to claim 2, wherein the hole is plural in number and each of said body and said lid is provided along an edge thereof with the plurality of holes regularly spaced from each other to exhaust steam from the container to the outside while cooking the food.

24. The cooking container according to claim 1, wherein the heat transfer part of each of the body and the lid is provided on an inside surface thereof with a coated layer to prevent the food from becoming stuck to the heat transfer part.

25. The cooking container according to claim 1, wherein the heating part of each of the body and the lid is made of a mixture of silicon rubber and ferrite powder and has a constant thickness, the mixture of silicon rubber and ferrite powder used to form the heating part of the body being prepared such that a weight ratio of the ferrite powder to the silicon rubber is higher than that of the heating part of the lid.

26. The cooking container according to claim 1, wherein the heating parts of the body and the lid are made of a mixture of silicon rubber and ferrite powder, and the heating part of the body is thicker than the heating part of the lid.

27. The cooking container according to claim 1, wherein the heating parts of the body and the lid are made of a mixture of silicon rubber and ferrit powder such that the mixture of the silicon rubber and ferrite powder forming the heating part of the body has a higher weight ratio than that of the weight ratio of the heating part of the lid.

28. The cooking container according to claim 1, wherein the section area of the body is larger than that of the lid.

29. A microwave oven having a cooking cavity through which microwaves are radiated, and a cooking container seated in the cooking cavity and used to cook food using the microwaves, wherein said cooking container comprises:
   a body and a lid, each of said body and said lid including
      a heating part generating heat by using the microwaves, and a heat transfer part transferring heat from the heating part to the food;
   an embossment provided on an inside surface of at least one of said body and said lid, extending from one of an uplifted portion of said body and a bulged portion at said lid, to be brought into contact with the food, and
   a hole through one of a non-uplifted portion at said body and a non-bulged portion of said lid.

30. The microwave oven according to claim 29, wherein the embossment is provided on each of the body and the lid, thus forming a first cooking part.

31. The microwave oven according to claim 30, wherein two or more embossments are provided on each of the body and the lid while being regularly spaced apart from each other.

32. The microwave oven according to claim 30, further comprising a second cooking part extending from said first cooking part such that sliced bread placed on the embossment of said first cooking part and an at least one egg is placed in said second cooking part to cook the sliced bread and the at least one egg at the same time.

33. The microwave oven according to claim 32, wherein the body and the lid are seated in said cooking cavity while being contained in upper and lower casings made of a material capable of transmitting the microwaves.

34. The microwave oven according to claim 33, wherein the upper and lower casings are made of a material capable of resisting heat emitted from the body and the lid, and at least portions thereof come into contact with or are proximate to the body and the lid.

35. The microwave oven according to claim 33, wherein the lower casing is provided on a bottom thereof with a drain hole to drain moisture generated from the food during a process of cooking.

36. The microwave oven according to claim 30, wherein each of said body and said lid is provided along an edge thereof with a plurality of regularly spaced holes to exhaust steam from the container to the outside while cooking the food.

* * * * *

UNITED STATES PATENT AND TRADEMARK OFFICE
CERTIFICATE OF CORRECTION

PATENT NO. : 7,205,517 B2 Page 1 of 1
APPLICATION NO. : 10/171998
DATED : April 17, 2007
INVENTOR(S) : Jung-Eui Hoh It is certified that error appears in the above-identified patent and that said Letters Patent is hereby corrected as shown below:

Column 9, Line 17, after "of the" insert --body--.

Column 10, Line 47, change "ferrit" to --ferrite--.

Column 10, Line 52, change "section" to --sectional--.

Signed and Sealed this

Thirty-first Day of July, 2007

JON W. DUDAS
*Director of the United States Patent and Trademark Office*